4 3,538,106
Patented Nov. 3, 1970

3,538,106
2-(TRIHALOGENOANILINO)-NICOTINURIC ACID, THE CORRESPONDING GLYCINATES AND DERIVATIVES THEREOF
Charles Hoffmann, Enghien-les-Bains, France, assignor to Societe Anonyme dite: Laboratoires U.P.S.A., Gennevilliers, Hauts-de-Seine, France, a company of France
No Drawing. Filed Jan. 10, 1969, Ser. No. 790,477
Claims priority, application Great Britain, Jan. 22, 1968, 3,273/68; July 10, 1968, 32,988/68
Int. Cl. C07d 31/36
U.S. Cl. 260—295.5      11 Claims

ABSTRACT OF THE DISCLOSURE

The invention provides the derivatives of nicotinuric acid of the formula:

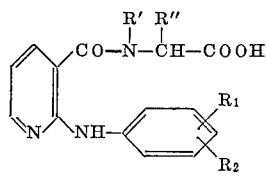

and their pharmaceutically acceptable non-toxic salts, amides and esters, wherein R' represents a hydrogen atom or a lower alkyl radical, R" a hydrogen atom, a lower alkyl radical or methylmercaptoethyl, and $R_1$ and $R_2$ may be identical or different and each represents a hydrogen or halogen atom or a lower alkyl, lower alkoxy or trihalogenomethyl radical, which are useful as anti-inflammation, antalgic and fibrinolytic agents.

---

The present invention provides the derivatives of nicotinuric acid of the formula:

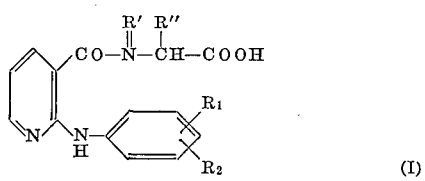  (I)

and their non-toxic, pharmaceutical acceptable salts, esters and amides, wherein R' represents a hydrogen atom or a lower alkyl radical, R" represents a hydrogen atom, a lower alkyl radical or methylmercaptoethyl, and $R_1$ and $R_2$ may be identical or different and each represents a hydrogen or halogen atom or a lower alkyl, lower alkoxy or trihalogenomethyl radical. The term "lower alkyl" means methyl or ethyl, and "lower alkoxy," methoxy or ethoxy.

The compounds of Formula I possess valuable pharmacological properties and can be used in therapy, especially as anti-inflammation, antalgic and fibrinolytic agents.

The compounds of Formula I are prepared by direct condensation of a halide of 2-phenylamino-nicotinic acid of formula:

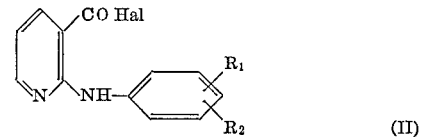  (II)

in which Hal represents a halogen atom, preferably chlorine, and $R_1$ and $R_2$ are as defined above, with an alkali metal salt of glycine or a glycine derivative of formula:

  (III)

in which R' and R" are as defined above and M designates an alkali metal such as Na or K, in an aqueous medium. The alkali metal salt obtained may be converted to the free acid by acidification.

The compounds of Formula I are also prepared by condensation of a halide of 2-phenylamino-nicotinic acid of Formula II with an alkyl ester of glycine of formula

  (IV)

in which R' and R" are as defined above and $R_3$ is a lower alkyl radical, so as to obtain the corresponding alkyl ester of 2-phenylamino-nicotinuric acid

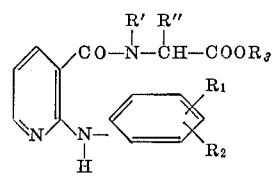

This ester is then saponified in an alkaline medium to yield the desired 2-phenylamino-nicotinuric acid of Formula I.

The invention is illustrated by the following non-limiting examples.

EXAMPLE 1

2-(m-trifluoromethylphenyl)amino-nicotinuric acid 25 g. of 2 - (m-trifluoromethylphenylamino)-nicotinic acid chloride dissolved in 50 ml. of benzene are added in portions to a solution of 13 g. of glycine in 40 ml. of water containing 6.5 g. of solid NaOH, with rapid stirring. Stirring is continued for 5 hours while the reaction mixture is kept at 40° C. by means of a waterbath. The benzene is decanted and the aqueous layer is acidified to pH 3–4 with acetic acid. A viscous product precipitates which gradually hardens. It is filtered off, washed with water, and suspended in hot water which is raised to the boil for 5 minutes. The mixture is allowed to cool slowly and again filtered. 23 g. of the desired product are obtained and recrystallised from 100 ml. of a mixture of water and ethanol (50:50) with treatment with carbon black. After drying at 100° C., 20 g. of the desired pure product melting at 174–175° C., are obtained.

EXAMPLE 2

2 - (m - trifluoromethylphenylamino)nicotinuric acid [the glycinamide of 2 - (m - trifluoromethylphenylamino) nicotinic acid]

(A) 100 g. of 2-(m-trifluoromethylphenylamino)-nicotinic acid are converted, in a manner known per se, to the corresponding acid chloride by reaction with thionyl chloride in an anhydruos benzene medium. The resulting acid chloride is isolated in the usual manner and redissolved in 200 ml. of anhydrous benzene. 49 g. of ethyl glycinate hydrochloride are added thereto and the mixture heated under reflux for 9 hours. After cooling the crystalline product is filtered off and first washed with benzene and then with water. After drying in an oven at 80° C., it is recrystallized from a mixture of water and ethanol (1/1 by volume) to yield 70 g. of colourless ethyl 2-(m-trifluoromethylphenyl)amino-nicotinoyl glycinate ester melting at 137° C.

Analysis.—Calcd. for $C_{17}H_{16}F_3N_3O_3$ (percent): N, 11.43. Found (percent): N, 11.66.

(B) *Saponification.*—53 g. of the ethyl ester obtained in the preceding stage (A), 60 ml. of N KOH, 800 ml. of water and 120 ml. of methanol are stirred in a water bath at 50° C. until complete solution has taken place and a limpid yellow solution is obtained (about 8 hours). The pH is then brought to 5.5–6 with glacial acetic acid and the mixture is allowed to crystallise over-night in the cold. The voluminous white product is filtered off next day, again repeatedly washed with ice-cold water, and then thoroughly suction-filtered. A last wash with chloroform removes possible remnants of unsaponified ester (the acid is insoluble in chloroform). The desired acid obtained can be recrystallised from a mixture of water and ethanol (1/1 by volume). The desired acid is thus obtained in a yield of 65–70% from the ester and about 10% of ester are recovered in the chloroform wash liquors. The pure acid forms fine white needles which melt at 174–175° C., having a purity of 99.7–99.8% on acidimetric determination.

*Analysis.*—Calculated for $C_{15}H_{12}F_3N_3O_3$ (percent): C, 53.10; H, 3.56; N, 12.38; F, 16.80. Found (percent): C, 53.11; H, 3.79; N, 12.74; F, 16.80.

EXAMPLE 3

2-(m-trifluoromethyl-p-chlorophenyl) amino-nicotinuric acid 19 g. of 2-(m-trifluoromethyl-p-chlorophenyl)-amino-nicotinic acid chloride dissolved in 300 ml. of benzene are added in portions to a solution of 8.5 g. of glycine in 40 ml. of water containing 9 g. of solid KOH whilst stirring. Stirring is continued for 6 hours at ordinary temperature. The benzene is then decanted and the aqueous alkaline solution is extracted with 50 ml. of benzene. After treatment with carbon black and filtration, the alkaline solution is acidified to pH 3–4 (with acetic acid). A gelatinous grey product precipitates which hardens gradually. It is filtered off, washed with water until neutral, and dried first at 60° C. and then at 100° C. 20 g. of the crude product desired, melting at 166°–168° (Kofler bench), are thus obtained.

Recrystallisation from 50 ml. of a mixture of isopropanol and water (50/50) yields 13 g. of pure product, M.P. 178° C.

*Analysis.*—Calculated for $C_{15}H_{11}ClF_3N_3O$ (percent): C, 48.20; H, 2.96; N, 11.24; F, 15.25; Cl, 9.48. Found (percent): C, 48.01; H, 3.09; N, 11.14; F, 15.22; Cl, 9.47.

EXAMPLE 4

N-[2-(o-methyl-m-chlorophenyl)amino-nicotinoyl] glycine

A solution of 50 g. of 2-(o-methyl-m-chloroanilino)-nicotinic acid chloride (M.P. 162/164° C.) in 3 litres of benzene is added over the course of 30 minutes, with stirring, to a solution of 26.8 g. of glycine in 300 ml. of water and 14.5 g. of sodium hydroxide. Stirring is continued for 5½ hours, and the benzene is then decanted from the yellow aqueous alkaline solution and the latter acidified to pH 3 with concentrated hydrochloric acid. The resulting precipitate strongly retains water after filtration. It is suspended in 200 ml. of diethyl ether whilst stirring. It dissolves completely and then rapidly yields white crystals which are filtered off and washed with a little more ether. About 50 g. of the desired product, melting at 198–200° C. on the Kofler bench, are obtained.

The pure product, melting at 200–202° C. whilst turning green, is obtained by recrystallisation from isopropanol.

*Analysis.*—Calculated for $C_{15}H_{14}ClN_3O_3$ (percent): Cl, 11.08; N, 13.14. Found (percent): Cl, 10.98; N, 13.09. Acidity (percent): 99.76.

On substituting N-methylglycine (sarcosine) for glycine in the preceding examples, the corresponding N-methylated derivatives are obtained and this is illustrated in Example 5 below.

EXAMPLE 5

N-[2-(m-trifluoromethylphenyl) amino-nicotinoyl]-N-methylglycine

A solution of 20 g. of 2-(m-trifluoromethylphenyl) amino-nicotinic acid chloride in 60 ml. of benzene is added in portions to a solution of 12 g. of sarcosine and 5 g. of pure NaOH in 40 ml. of water while stirring rapidly. Stirring is continued for 5 hours while keeping the temperature at 40° C. The benzene is decanted and the aqueous layer is acidified with acetic acid. The viscous product crystallises slowly on scratching. It is filtered off, washed with water and dried at 100° C. 23 g. of the desired product are obtained and this is recrystallised from 200 ml. of a mixture of water and ethanol (50:50) to obtain a pure product, M.P. 182° C.

*Analysis.*—Calculated for $C_{16}H_{14}F_3N_3O_3$ (percent): N, 11.89. Found (percent): N, 11.85.

EXAMPLE 6

N-[2-(m-trifluoromethylphenyl)amino-nicotinoyl]-N-ethylglycine 10.3 g. (0.1 mol) of N-ethylglycine are dissolved in 100 ml. of normal sodium hydroxide solution (0.1 mol). 15 g. (0.05 mol) of 2-(m-trifluoromethylphenyl)amino-nicotinic acid chloride dissolved in 150 ml. of benzene are introduced into the stirred solution in four portions. The mixture is stirred for four hours, care being taken for the medium to remain alkaline. The aqueous alkaline layer is thereafter decanted and acidified to pH 3 with concentrated HCl. The resulting white precipitate is filtered off, washed with water and dried at 100° C. After recrystallisation from benzene, 6 g. of the desired product melting at 142° C. are obtained.

*Analysis.*—Calculated for $C_{17}H_{16}F_3N_3O_3$ (percent): N, 11.43. Found (percent): N, 11.61.

On substituting DL-α-alanine (DL-2-aminopropionic acid) for glycine or sarcosine, the corresponding α-methylated derivative is obtained as can be seen in Example 7 below.

EXAMPLE 7

N-[2-(m-trifluoromethylphenyl)amino-nicotinoyl]-DL-α-alanine 11.8 g. of DL-α-alanine are suspended in 100 ml. of water. 50 ml. of a sodium hydroxide solution containing 5.2% of NaOH are added. 20 g. of 2-(m-trifluoromethylphenyl)amino-nicotinic acid chloride dissolved in 80 ml. of benzene are then introduced as a fairly rapid stream. The alkalinity of the mixture is watched, adding a little of the 5.2% sodium hydroxide solution from time to time if necessary. The total period of stirring is 6 hours. If the sodium salt of the compound tends to precipitate out, water is again added to redissolve it. At the end of the reaction, the mixture must be alkaline.

The benzene is decanted and the aqueous alkaline fraction is filtered if necessary and acidified to pH 4–4.5 with acetic acid. A viscous product precipitates which, when raised to the boil in the reaction medium, gradually assumes a hard consistency. It is powdered, filtered, washed with water and then washed with a little benzene. It is dried at 60° C. and then at 100° C. 16 g. of the crude desired product are obtained.

12 g. of pure product melting at 150–152° C. are obtained by recrystallisation from a mixture of water and ethyl alcohol (50/50).

*Analysis.*—Calculated for $C_{16}H_{14}F_3N_3O_3$ (percent): N, 11.89. Found (percent): N, 11.90.

The determination of the acidity corresponds to 99.94% purity.

EXAMPLE 8

N-[2-(m-trifluoromethylphenyl)amino-nicotinoyl]-DL-methionine 14.92 g. (0.1 mol) of methionine are dissolved in 100 ml. of normal sodium hydroxide solution (0.1 mol). A solution of 15 g. (0.05 mol) of 2-(m-trifluoromethylphenyl)amino-nicotinic acid chloride dissolved in 150 ml. of benzene is poured in four portions into the stirred solution. Care is taken that the mixture remains in an alkaline medium (to phenoylphthalein), adding a little normal sodium hydroxide solution as necessary. The mixture is stirred for 4 hours and then transferred to a separator. The lower, aqueous alkaline, layer is separated and acidified to pH 3 with concentrated hydrochloric acid. The resulting precipitate is filtered off, washed with water until neutral, and dried at 100° C. After two recrystallisations from benzene, 11 g. of the desired white product are obtained, having a constant melting point of 151° C.

*Analysis.*—Calculated for $C_{18}H_{18}F_3N_3O_3S$ (percent): N, 10.16; S, 7.75. Found (percent): N, 10.17; S, 7.77.

The pharmacological activities of the compounds of the invention are demonstrated by the tests below. By way of comparison, the pharmacological action of 2-m-trifluoromethylphenylamino-nicotinic acid (taken as the reference compound) is also given in these tests.

*Acute toxicity.*—The products are administered by an oesophagal probe and the $LD_{50}$ is calculated after one week.

*Anti-inflammatory action — Carraghenin and kaolin oedemas.*—The rats treated with the products to be studied are given 0.05 ml. of a 1% strength carraghenin solution or of a 10% strength kaolin suspension. The oedema is measured at regular intervals.

*Yeast hyperthermy.*—1 ml./100 g. of a 1 g. percent yeast suspension is subcutaneously administered to rats. 2 hours later they are treated with the product to be studied, administered orally. The rectal temperature is followed for 6 hours.

*Fibrinolytic action.*—Clots of human plasma are introduced into solutions of the products to be tested. The fibrinolytic action is assessed after 48 hours in an oven at 37° C.

*Ulcerigenic action.*—The product is given to fasting rats as a gum suspension. The rats are killed after 6 hours and the stomach is removed and subjected to an anatomapathological examination.

*Analgesic action.*—Mice treated with the products to be tested are placed on a heated plate kept at a constant temperature. The reaction times (licking of the front paws) are observed.

The results of these tests are summarized in the following table.

The following administration forms can be prepared, especially with the compound of Example 1.

Gelatine-coated pills

Active principle (compound of Example 1)—0.200 g.
Talc—0.023 g.
Corn starch—0.022 g.
Magnesium stearate—0.005 g.
Representing, for 1 gelatine-coated pill—0.250 g. of the final mixture Suppositories The compound of Example 1—0.250 g.
Semi-synthetic glycerides or cacao butter—q.s.p. for 1 finished suppository of about 3 g.

Ointment containing 5% of the compound of Example 1

With a natural excipient (lanolin or vaseline) or a synthetic excipient.

Aqueous solution (lotion) containing 2% of the compound of Example 1

The invention thus includes within its scope pharmaceutical compositions containing a compound of Formula I, as acid or non-toxic pharmaceutically acceptable salt, ester, or amide, and a non-toxic pharmaceutically acceptable carrier or vehicle.

We claim:

1. A nicotinuric acid derivative of the formula:

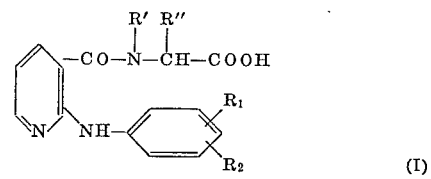

and its non-toxic, pharmaceutically acceptable salts, esters and amides wherein R' represents a hydrogen atom or a lower alkyl radical, R" represents a hydrogen atom, a lower alkyl radical, and $R_1$ and $R_2$ may be identical or different and each represents a hydrogen or halogen atom or a lower alkyl, lower alkoxy or trihalogenomethyl radical.

2. A nicotinuric acid derivative according to claim 1 in which R' and R" are hydrogen, and its non-toxic, pharmaceutically acceptable salts and lower-alkyl esters thereof.

TABLE

| Test | Compound of example | | | | | | | | Reference compound |
|---|---|---|---|---|---|---|---|---|---|
|  | 1 | 2 | 3 | 4 | 5 | 6 | 7 | 8 |  |
| Acute toxicity: |  |  |  |  |  |  |  |  |  |
| $LD_{50}$, 7 days (rats) | 1.4 | 1.5 | 1 | 1 | >2.2 | >2 | 1 | >2 | 0.45 |
| G./kg., orally (mice) | 0.7 |  | 0.750 |  | 1 | >3 | 3 | >3 |  |
| Carraghenin oedema, $ED_{50}$ mg./kg., orally | 82 | 55 | 170 | 170 | >400 | 200 | 150 | 180 | 98 |
| Kaolin oedema, $ED_{50}$ mg./kg., orally | 150 | 115 | 145 |  | 160 |  | 150 | 190 | 180 |
| Yeast hyperthermy, $ED_{50}$ mg./kg., orally | 190 | 200 | 210 | 200 | >400 | 110 | 87 |  | 200 |
| Fibrinolytic activity, first and last active concentration, $10^{-3}$ mol/litre | 4–16 | 4 | 2–4 |  | 16–32 |  | 2–8 | 2–4 | 4 |
| Antalgic test: phenylbenzoquinone, $ED_{50}$ mg./kg., orally | 350 |  | 195 | 400 | 19 | 63 | 130 | >400 |  |
| Analgesic action, $ED_{50}$ mg./kg | | 400 | | | | | | | 150 |
| Ulcerigenic action | No | No | No | No | No | No | No | No | Yes |

According to this table, the compounds according to the invention are, generally, better anti-inflammatory agents, equally good fibrinolytic agents, and two to four times less toxic than the nicotinic derivative serving as a reference compound. Furthermore, they do not possess an ulcerigenic action.

Further, clinical experiments carried out particularly with the compound of Example 1 gave satisfactory results in the treatment of the following conditions: primitive osteonecrosis of the femoral head; spondylarthritis at the sacro-iliac stage; and sero-positive oligo-articular polyarthritis.

3. A nicotinuric acid derivative according to claim 1 in which R" is hydrogen or methyl, and its non-toxic, pharmaceutically acceptable salts and lower-alkyl esters thereof.

4. A nicotinuric acid derivative according to claim 1 in which $R_1$ is m-trifluoromethyl and $R_2$ is hydrogen or chlorine, and its non-toxic, pharmaceutically acceptable salts and lower-alkyl esters thereof.

5. A nicotinuric acid derivative according to claim 1 which is 2-(m-trifluoromethylphenyl)amino-nicotinuric acid.

6. A nicotinuric acid derivative according to claim 1 which is ethyl 2 - (m-trifluoromethylphenyl)amino-nicotinoyl-glycinate.

7. A nicotinuric acid derivative according to claim 1 which is 2 - (m-trifluoromethyl-p-chlorophenyl)amino-nicotinuric acid.

8. A nicotinuric acid derivative according to claim 1 which is N-[2-(o-mthyl-m-chlorophenyl)amino-nicotinoyl]-glycine.

9. A nicotinuric acid derivative according to claim 1 which is N-[2-(m-trifluoromethylphenyl)amino-nicotinoyl]-N-methylglycine.

10. A nicotinuric acid derivative according to claim 1 which is N - [2 - (m-trifluoromethylphenyl)amino-nicotinoyl]-N-ethylglycine.

11. A nicotinuric acid derivative according to claim 1 which is N - [2 - (m-trifluoromethylphenyl)amino-nicotinoyl]α-alanine.

References Cited
UNITED STATES PATENTS

| | | | |
|---|---|---|---|
| 3,415,835 | 12/1968 | Stempel et al. | 260—295.5 |
| 3,454,587 | 7/1969 | Littell et al. | 260—295.5 |

ALAN L. ROTMAN, Primary Examiner

U.S. Cl. X.R.

260—294.8